Patented Sept. 6, 1932

1,875,911

UNITED STATES PATENT OFFICE

WILLIAM ANDREWS, OF NORTON-ON-TEES, ENGLAND, ASSIGNOR TO IMPERIAL CHEMICAL INDUSTRIES LIMITED, OF LONDON, ENGLAND, A BRITISH COMPANY

WELDING OF COPPER

No Drawing. Application filed January 24, 1930, Serial No. 423,272, and in Great Britain January 29, 1929.

The present invention relates to the welding of copper, and the construction of welded apparatus, especially chemical apparatus therefrom.

Copper is well known to be difficult to weld. Welded joints are often found to be weak which may be attributed to the excessive heating of the solid metal adjacent the weld, the possibility of oxide inclusions in the molten metal of the weld and also to the presence of oxide in the solid copper adjacent to the weld.

Many proposals have been made to prevent the oxidation of the copper which is molten during the welding operation by the use of deoxidants such as phosphorus or by employing welding rods of special copper alloys, including phosphor-copper, or by using certain silver copper alloys.

I have found that contrary to the generally accepted view, oxidation of copper in the solid state at high temperature, is not confined to the surface and that such interior oxidation is detrimental to the mechanical properties of the copper.

The object of the present invention is to provide a method of readily and satisfactorily welding copper bodies by preventing the interior oxidation of the copper adjacent the points to be welded. It will, therefore, be understood that by the word "adjacent" it is intended to include that portion of the copper which, though not rendered molten during the welding operation, is subjected to a very high temperature.

According to my invention, while I provide that the metal which is molten during welding, is deoxidized by suitable deoxidants as is usual I also modify the composition of that part of the metal which is subjected to high temperature during the welding without actually being melted. Preferably the whole article or apparatus under construction may be modified in composition, whereby it is possible to weld such apparatus at any desired point without introducing weak places. It would be expensive and impracticable to make the whole article or apparatus of a silver-copper alloy, but I have found that the desired result can be obtained if the metal to be welded contains a small proportion of a deoxidant, especially phosphorus.

I have now found that copper alloyed with a small proportion of a deoxidizing element, especially phosphorus may readily and satisfactorily be welded. Only a trace e. g. 0.03 to 0.05% of phosphorus need be present. But if phosphorus itself is used for deoxidizing the copper, the amount of phosphorus should be definitely more than that required for deoxidation so as to leave a certain, if small, excess.

I have found that copper alloyed with phosphorus in the quantities stated possesses corrosion resistance properties which are as good as those of ordinary copper in general, and are considerably improved in the particular case when the copper is exposed to a medium of a reducing nature.

An important feature of the invention consists in a method of manufacturing articles of copper, especially chemical apparatus in which the portions which are to be welded together consist of copper alloyed with a deoxidizing element especially phosphorus.

Finally the invention comprises apparatus, especially for carrying out chemical reactions in which the whole apparatus or at any rate the portions welded together, consists of copper containing alloyed therewith a deoxidizing element.

As has already been stated, the proportion of other element must only be small. Phosphorus is especially suitable but other elements such as silicon, boron, manganese, cadmium or the like or two or more of these may be used. A flux is desirable and one composed as follows may be used:—

Microcosmic salt 45%
Powdered borax glass 35–45%
Boric acid up to 10%
Magnesium silicate 6%
Litharge 3%
Lithium fluoride 1%

Only so much of the added element should be used as will form a solid solution with the copper. In any case the properties of the copper are not to be substantially modified by the addition of the added element, except in so far as welding is facilitated.

The copper is preferably welded by the aid of a composite welding rod containing copper, alloyed or coated with silver and a deoxidant, in conjunction with a flux and a deoxidant.

I declare that what I claim is:—

1. Welded articles for use in chemical and like processes in which the whole article is made from copper containing a small amount of a deoxidant.

2. Articles as claimed in claim 1 in which phosphorus is used as deoxidant.

3. Articles as claimed in claim 1 in which 0.03 to 0.05% of phosphorus is present as the deoxidant.

4. Welded copper apparatus for use in chemical processes in which the parts to be welded together consist of copper alloyed with a small quantity of a deoxidant which is sufficient to permit welding without making the parts brittle.

5. Process of welding copper bodies in which those portions of the said bodies adjacent to the points which are to be joined, consist of copper alloyed with a small quantity of a de-oxidant sufficient to prevent oxidation in the region of the weld without rendering the weld brittle.

In witness whereof, I have hereunto signed my name this 14th day of January, 1930.

WILLIAM ANDREWS.